(12) United States Patent
Innocenti et al.

(10) Patent No.: US 8,554,054 B2
(45) Date of Patent: Oct. 8, 2013

(54) AUTOMATED DIGITAL VIDEO EDITING SYSTEM TO COMBINE STORED VIDEO ADVERTISING WITH JUST-IN TIME CONTENT

(76) Inventors: Emil George Innocenti, Wayne, NJ (US); Robert John Spangler, Madison, NJ (US)

( * ) Notice: Subject to any disclaimer, the term of this patent is extended or adjusted under 35 U.S.C. 154(b) by 11 days.

(21) Appl. No.: 13/437,614

(22) Filed: Apr. 2, 2012

(65) Prior Publication Data

US 2012/0251073 A1      Oct. 4, 2012

Related U.S. Application Data

(60) Provisional application No. 61/470,104, filed on Mar. 31, 2011.

(51) Int. Cl.
*H04N 5/92* (2006.01)
*H04N 5/93* (2006.01)

(52) U.S. Cl.
USPC .......................................... 386/248; 386/250

(58) Field of Classification Search
USPC ................. 386/249, 248, 250, 251, 278, 287, 386/288
See application file for complete search history.

(56) References Cited

U.S. PATENT DOCUMENTS

| | | | |
|---|---|---|---|
| 2003/0056213 A1* | 3/2003 | McFaddin et al. | 725/32 |
| 2012/0023522 A1* | 1/2012 | Anderson et al. | 725/35 |

* cited by examiner

*Primary Examiner* — Robert Chevalier
(74) *Attorney, Agent, or Firm* — Abelman, Frayne & Schwab

(57) ABSTRACT

A system and method are provided for an automated digital video editing system that can combine previously stored video advertising with just-in-time content video, such as breaking news, sports, traffic and weather. The system and method can deliver the combined video to mobile devices in accordance with demographic, geographic, or other criteria selected by the advertiser.

20 Claims, 4 Drawing Sheets

AUTOMATED DIGITAL VIDEO EDITING SYSTEM TO COMBINE STORED VIDEO ADVERTISING WITH JUST-IN TIME CONTENT

RELATED APPLICATIONS

This application claims the benefit of U.S. Provisional Patent Application No. 61/470,104 filed Mar. 31, 2011, the disclosure of which is incorporated herein by reference in its entirety.

BACKGROUND OF THE INVENTION

1. Field of the Invention

This invention relates to an automated digital video editing system, and in particular to systems and methods for combining video advertising with just-in-time content for rapid distribution to mobile devices.

2. Description of Related Art

Broadcasters seeking to deliver video to mobile devices face many difficulties. Recent surveys found that 234 million Americans used mobile devices. However, only one out of three have access to the Internet. Furthermore, 2 out of 3 users cannot receive most videos. Barriers to entry include the fact that there are numerous carriers, devices, operating systems and features, so that a solution that works for one user may not work for another. Rather than the trend favoring interoperability, the situation is growing worse, due to competing technologies and loose compliance with industry standards.

In addition, combining advertising with content in the same format has traditionally been labor-intensive and has taken considerable time. Prior art methods have either presented breaking news, sports, traffic and weather without relevant advertising content, or else have combined the content with relevant advertising after a significant delay in time.

It is therefore an object of the present invention to provide a comprehensive solution that can deliver video to mobile users regardless of carrier; make, model or type of mobile device; operating system or features; or type of mobile device plan, and to do so with an incorporation of relevant advertising in a timely fashion. Another object is to manage the statistics of such advertisements.

SUMMARY OF THE INVENTION

The above objects and further advantages are provided by the methods and systems of the invention for improved delivery of video programming and advertising to mobile users.

According to one aspect of the present invention a system and method are provided for delivering video to mobile users regardless of carrier; make, model or type of mobile device; operating system or features; or type of mobile device plan. A further advantage can be obtained by reaching all mobile devices without the need to install any applications onto the device.

It is another object of the present invention to provide for secondary content dissemination, such as peer-to-peer forwarding, allowing support for viral video and social media.

It is another object of the present invention to provide for managing the advertising statistics so that advertisers can judge the efficacy of an advertisement or advertising campaign, and so that a user can track how far an advertisement has been socially disseminated through viral video and social media.

It is a further object of the present invention that broadcasts be upgradeable to meet the requirements of device upgrades, emerging devices, and media protocols.

It is a further object of the present invention to integrate advertising into the broadcast of content, such that advertising media is stored and scheduled by target demographic, geography, and/or news topic as requested by the advertiser, and then paired with the relevant programming as it occurs and delivered to the targeted mobile users. The action can be user-initiated or automated.

It is a further object of the present invention to integrate custom links, forms, surveys and barcodes with the delivered video content and advertising, allowing the mobile user to respond directly to the network and/or advertiser with text, photo or video. Mobile analytics can record the user responses.

BRIEF DESCRIPTION OF THE DRAWINGS

The invention will be described in further detail below and with reference to the attached drawings in which the same or similar elements are referred to by the same or similar reference numerals, in which.

DETAILED DESCRIPTION OF THE INVENTION

The present invention broadly comprehends an automated digital video editing system to combine stored video advertising with just-in-time content for rapid distribution to mobile devices.

Reference will now be made in detail to implementations of the invention, examples of which are illustrated in the accompanying drawings.

Figure 1:
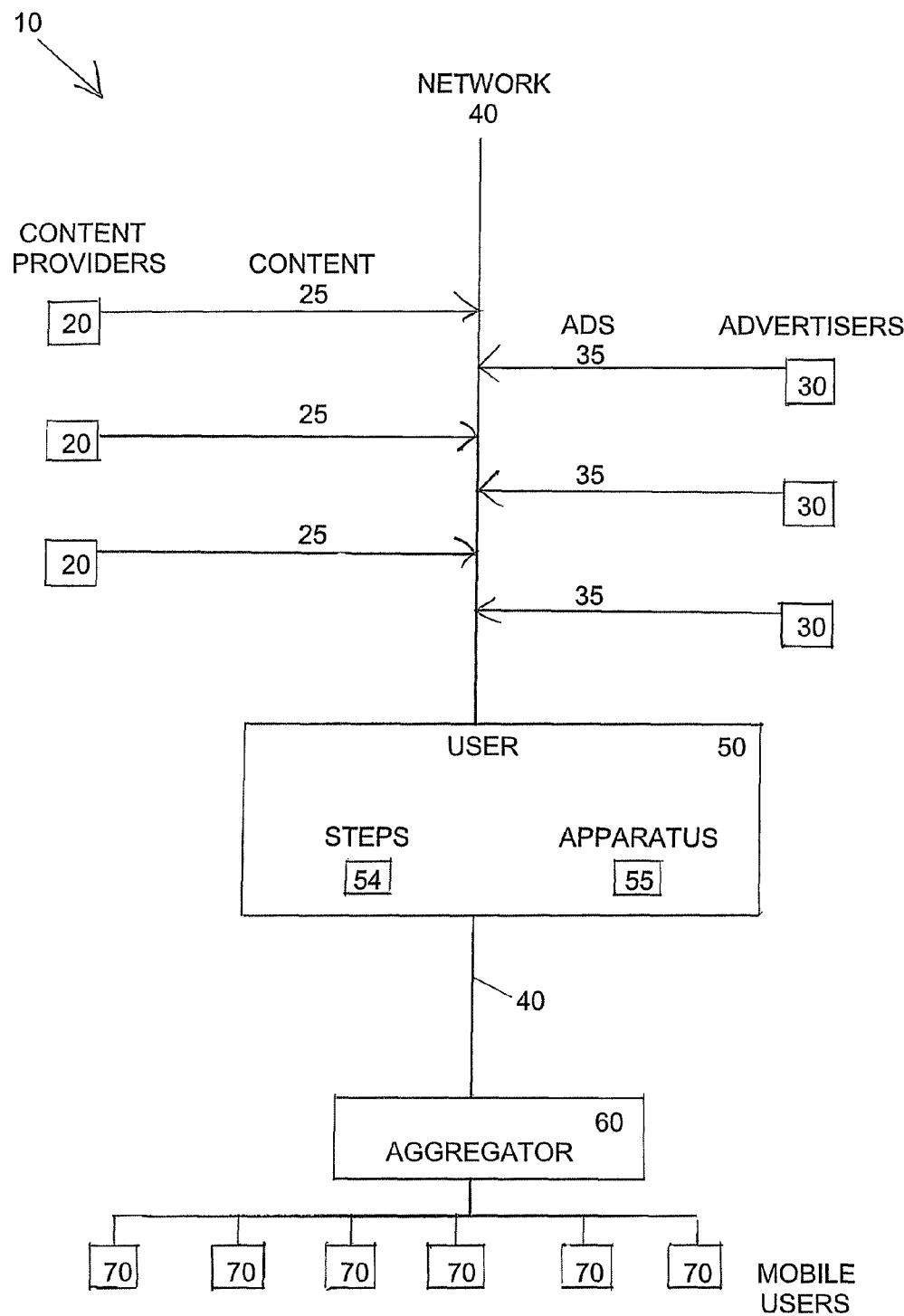
FIG. 1 is a block diagram of an automated video editing system.

FIG. 1 illustrates a use of an embodiment of an automated video editing system 10, in which content providers 20 sell advertising airtime to advertisers 30. Content providers 20 can be broadcasters such as ESPN, CNN, ABC, CBS, NBC, The Weather Channel, etc. Advertisers 30 can be any private or public entity who desires to present a message to mobile users 70. The advertisers 30 transmit their advertising videos 35, along with parameters for the broadcast of each advertisement, via a network 40 to a user 50 that performs the automated video editing steps 54 or that operates the automated video editing apparatus 55 presented below in greater detail. The network 40 can be the Internet, a private interface running on copper, fiberoptic, or wireless communications, etc. The user 50 can be the same as the content provider 20, the advertiser 30, or can be a third party. The content providers 20 also transmit their content 25 to the user 50 via network 40 (or via a similar communication method), and the user 50 integrates the advertisements with the content videos, as will be described below in greater detail. The content 25 can be entertainment, or breaking news, weather, sports, traffic, etc. The automated video editing system 10 prepares the combined videos for broadcast to mobile users 70 who are designated by the content providers 20 or the advertisers 30. The mobile users 70 can receive the prepared, combined videos via cell phones, smart phones, tablets, etc., via networks such as Sprint, AT&T, Verizon, etc. Typically, the user 50 sends the combined videos, together with delivery instructions, to an aggregator 60 for delivery to the mobile users 70. Delivery of the combined video from the user 50 to the aggregator 60 can be via network 40 or via a different network, a direct connection, etc.

Figure 2:
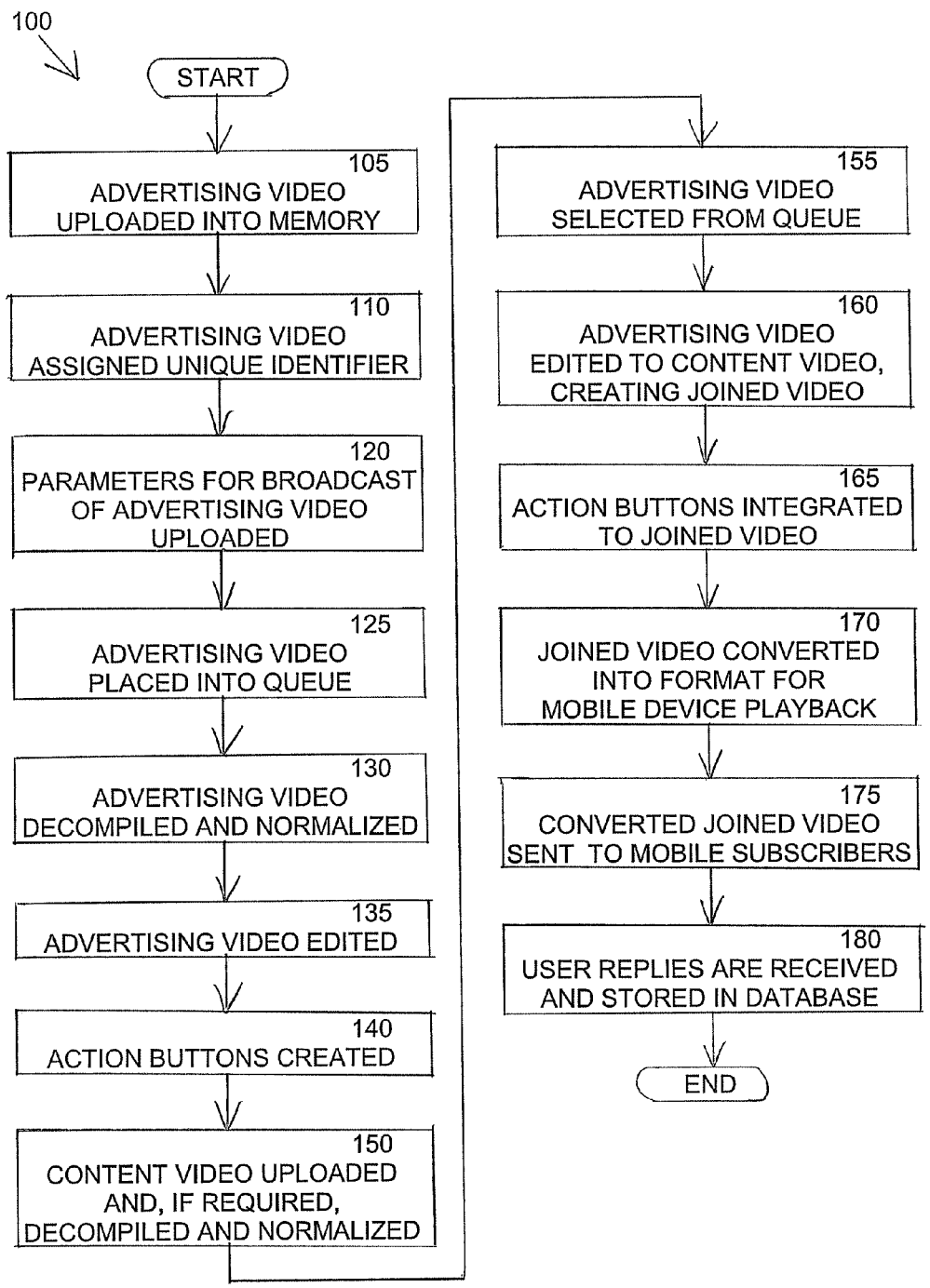
FIG. 2 is a flow chart of a method of automated video editing steps in accordance with an embodiment of the present invention.

FIG. 2 illustrates a process flowchart of steps carried out in an embodiment of the present invention, method 100. In the method, stored video advertising is combined with content and distributed. The content provider typically sells advertising airtime to advertisers.

In step 105, a user uploads an advertising video into a computer memory, for example via an Internet server. The user could be the advertiser. Alternatively, the user could be the content provider, who has obtained the advertising video from the advertiser (for example, if the content provider insists on approving an advertising video before allowing it to be attached to the content provider's programming). The method supports the upload of the advertising video in a broad range of video formats (such as AVI, MPEG, etc.). The computer memory that stores the advertising video can be located in the physical vicinity of the computer processor that is performing the steps of this embodiment of the invention. Alternatively, the computer memory that stores the advertising video can be located remotely from the computer processor, for example, in an outside server that is coupled to the computer processor via the Internet or other connection. The video can be uploaded via an upload form, via an application programming interface (API), or by storing it in a secure location that can be accessed.

In step 110, the advertising video of step 105 is assigned a unique identifier, via a subroutine that runs on a computer processor that is associated with the computer memory.

In step 120, a user provides parameters for broadcasting the advertising video, which parameters are stored into a computer memory. These parameters can include: the content provider or providers to be associated with the advertising video; the number of plays purchased; the days of the week and/or hours of the day in which the advertising video is to be broadcast; a particular subgroup of the subscriber base that should receive the advertisement (such as subscribers in a particular geographic region); the types of programming for which the advertising video will be broadcast (such as breaking news, sports highlights, weather reports, traffic reports); action buttons that should be added (for example, "Click here to reach advertiser," "click to reply to news provider," etc.); and whether the advertising video should be placed at the beginning, end, or both beginning and end of the content video.

The steps of this method do not necessarily need to be performed in the order presented. For example, step 120 can be performed concurrent with the upload of the advertising video in step 105. In such a case, step 110 of assigning a unique identifier to the advertising video can occur after step 120. In another example, the advertising video can be uploaded in step 105 by the content provider, with the unique identifier of step 110 then passed to the content provider so that it can approve the use of the advertising video, after which point step 120 can be performed. In yet another example, the advertising video can be provided from the advertiser to the content provider, which will approve the advertising video, and then upload it in step 105, with step 120 either preceding or following step 110. As can be seen, the method allows for great versatility.

In step 125, a subroutine executed in the computer processor analyzes the parameters stored in step 120, and places the advertising video into a queue for integration with content video, based upon the identified content provider(s), types of programming, days of the week, hours of day, geographic limitations, and so forth.

In step 130, the advertising video is decompiled and normalized into a universal format (such as AVI) in preparation for joining together with the content video. Any of a number of video editors can be used for this purpose, such as FFmpeg and Apple Quicktime. The video editing software is initiated to automatically convert the video, and the end result is stored in a special directory. The invention records the file properties (name, size, the date and time taken in, length, original format, etc.).

In step 135, the advertising video can be edited if desired, for example by adding a "bug" or logo to the advertising video. This optional step is performed during the normalization action within step 130.

In step 140, action buttons that were identified in step 120 are created, containing any specific requirements of the advertiser. The action buttons can be associated with the advertising video, with the content video, or with both. In another embodiment, an advertising video can be presented before the content video, with the same advertising video presented after the content video, and an action button only presented with the second presentation of the advertising video. In yet another embodiment, an advertising video can be presented before the content video, with a different advertising video presented after the content video, and an action button only presented with the second advertising video. This step can be carried out before and during the normalization process of step 130. When the user inputs any special requirements, they are performed immediately, and if necessary are performed in the background while other tasks are being performed, i.e., through multitasking.

In step 150, a content programmer, such as a news organization or media company, uploads a content video into computer memory, for example via Internet server. The programmer will also identify what type of content this is (such as breaking news, weather, traffic, sports, etc.). Depending on the format of the content video and the quality provided, the content video can also be subjected to decompilation and normalization into the same universal format that was selected for the advertising video in step 130.

In step 155, the system selects the next advertising video in the queue that matches the content provider and type of programming.

In step 160, the advertising video is automatically edited to the beginning, the end, or the beginning and end of the content video, as was specified in step 120, forming a joined video. Again, any of a number of video editors can be used for this purpose, including FFmpeg and Apple Quicktime.

In an alternate embodiment, a first advertising video can be integrated at the beginning of the content video, and a second advertising video can be integrated at the end of the content video. For example, when the content video is a winter storm advisory or traffic advisory, it can be proceeded with a first advertising video, "Michelin BLIZZAK studless ice and snow winter tires feature a patented MULTICELL compound that contains millions of microscopic pores to help grip ice without the use of studs." Following the content video of the weather or traffic report, a second advertising video can be, "For more information about Michelin BLIZZAK studless ice and snow winter tires, press the action button."

In yet another alternate embodiment, any number of content and advertising videos can be combined. For example, two advertising videos can be presented, and then a content video, and then another advertising video. The content video can also be broken into two or more pieces, with one or more advertising videos inserted between the pieces.

In step 165, action buttons created in step 140 are integrated into the joined video as specified. As noted earlier, the action button could be associated with an advertising video, with the content video, or with both.

In step 170, the joined video is converted into a format or formats best suited for mobile device playback. Once again, any of a number of video editors can be used, including FFmpeg and Apple Quicktime.

In step 175, the joined video is sent to the relevant list of mobile subscribers. The video can be distributed directly to mobile subscribers, or alternatively can be forwarded with the phone numbers of subscribers through an aggregator's API for distribution to mobile subscribers.

In step 180, users can reply via the action buttons using text or video, which is then sent back to the content provider for aggregation or integration into their webs sites or other media. The replies are stored in a mail database or other database. Advertisers can view the replies using any of a number of viewing systems, for example, they can see the replies in a discussion tree format.

Figure 3:
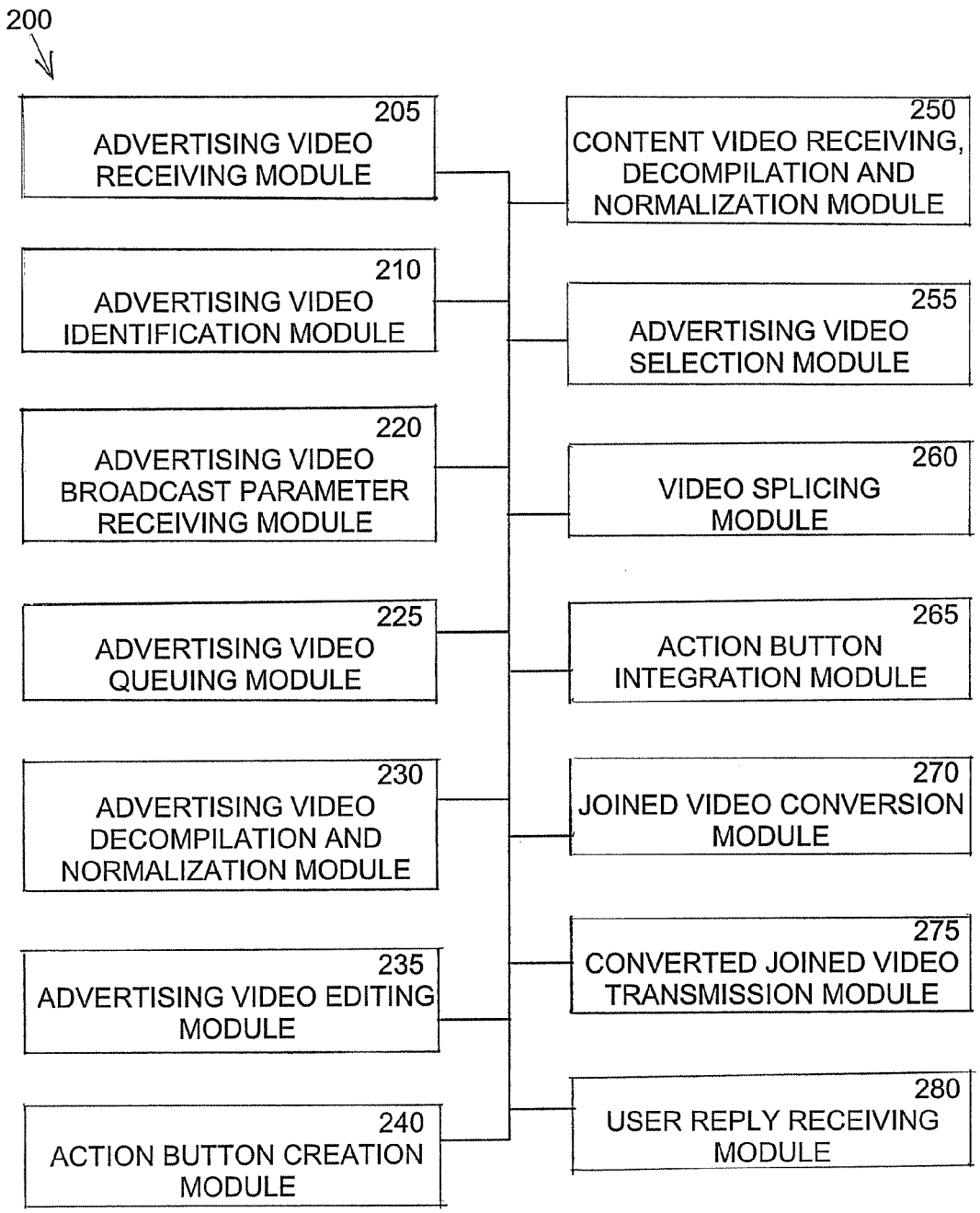
FIG. 3 is a schematic block diagram of modules in accordance with an embodiment of the present invention.

FIG. 3 illustrates a schematic block diagram of modules in accordance with an embodiment of the present invention, system 200. In the system, stored video advertising is combined with content and distributed. The content provider typically sells advertising to advertisers.

Module 205 receives an advertising video, for example via an upload form, via an API, or from a secure location, and stores this into a computer memory.

Module 210 assigns a unique identifier to the advertising video received in module 205.

Module 220 receives parameters for broadcasting the advertising video, which parameters are stored into a computer memory. These parameters can include: the content provider or providers to be associated with the advertising video (such as ESPN, CNN, etc.); the number of plays purchased; the days of the week and/or hours of the day in which the advertising video is to be broadcast; a particular subgroup of the subscriber base that should receive the advertisement (such as subscribers in a particular geographic region); the types of programming for which the advertising video will be broadcast (such as breaking news, sports highlights, weather reports, traffic reports); action buttons that should be added (for example, "Click here to reach advertiser," "click to reply to news provider," etc.); and whether the advertising video should be placed at the beginning, end, or both beginning and end of the content video.

Module 225 analyzes the parameters stored by module 220 and places the advertising video into a queue for integration with content video, based upon the identified content provider (s), types of programming, days of the week, hours of day, geographic limitations, and so forth.

Module 230 decompiles and normalizes the advertising video into a universal format (such as AVI) in preparation for joining together with the content video. Any of a number of video editors can be used for this purpose, such as FFmpeg and Apple Quicktime. The video editing software is initiated to automatically convert the video, and the end result is stored in a special directory. The file properties (name, size, the date and time taken in, length, original format, etc.) are recorded.

Module 235 edits the advertising video if necessary, for example by adding a "bug" or logo to the advertising video.

Module 240 creates any action buttons that are necessary, based on instructions received by module 220. The action buttons can be associated with the advertising video, with the content video, or with both.

Module 250 receives a content video, for example via Internet server, and stores this into computer memory. In addition, module 250 receives information regarding the type of content this is (such as breaking news, weather, traffic, sports, etc.). Depending on the format of the content video and the quality provided, the content video can also be subjected to decompilation and normalization into the same universal format that was selected for the advertising video in module 230.

Module 255 selects the next advertising video in the queue that matches the content provider and type of programming.

Module 260 automatically edits the advertising video to the beginning, the end, or the beginning and end of the content video, according to the instructions received in module 220. In an alternate embodiment, the module can edit a first advertising video at the beginning of the content video, and a second advertising video at the end of the content video. In another alternate embodiment, the module can edit together any number of content and advertising videos. The module can also break the content video into two or more pieces, with one or more advertising videos inserted between the pieces.

Module 265 integrates action buttons created by module 240 into the joined video as specified.

Module 270 converts the joined video into a format or formats best suited for mobile device playback. Any of a number of video editors can be used for this purpose, such as FFmpeg and Apple Quicktime.

Module 275 sends the joined video to the relevant list of mobile subscribers. The video can be distributed directly to mobile subscribers, or alternatively can be forwarded with the phone numbers of subscribers through an aggregator's API for distribution to mobile subscribers.

Module 280 receives replies via the action buttons using text or video, and sends these replies back to the content provider for aggregation or integration into their webs sites or other media. The replies are stored in a mail database or other database. Advertisers can view the replies using any of a number of viewing systems.

Figure 4:
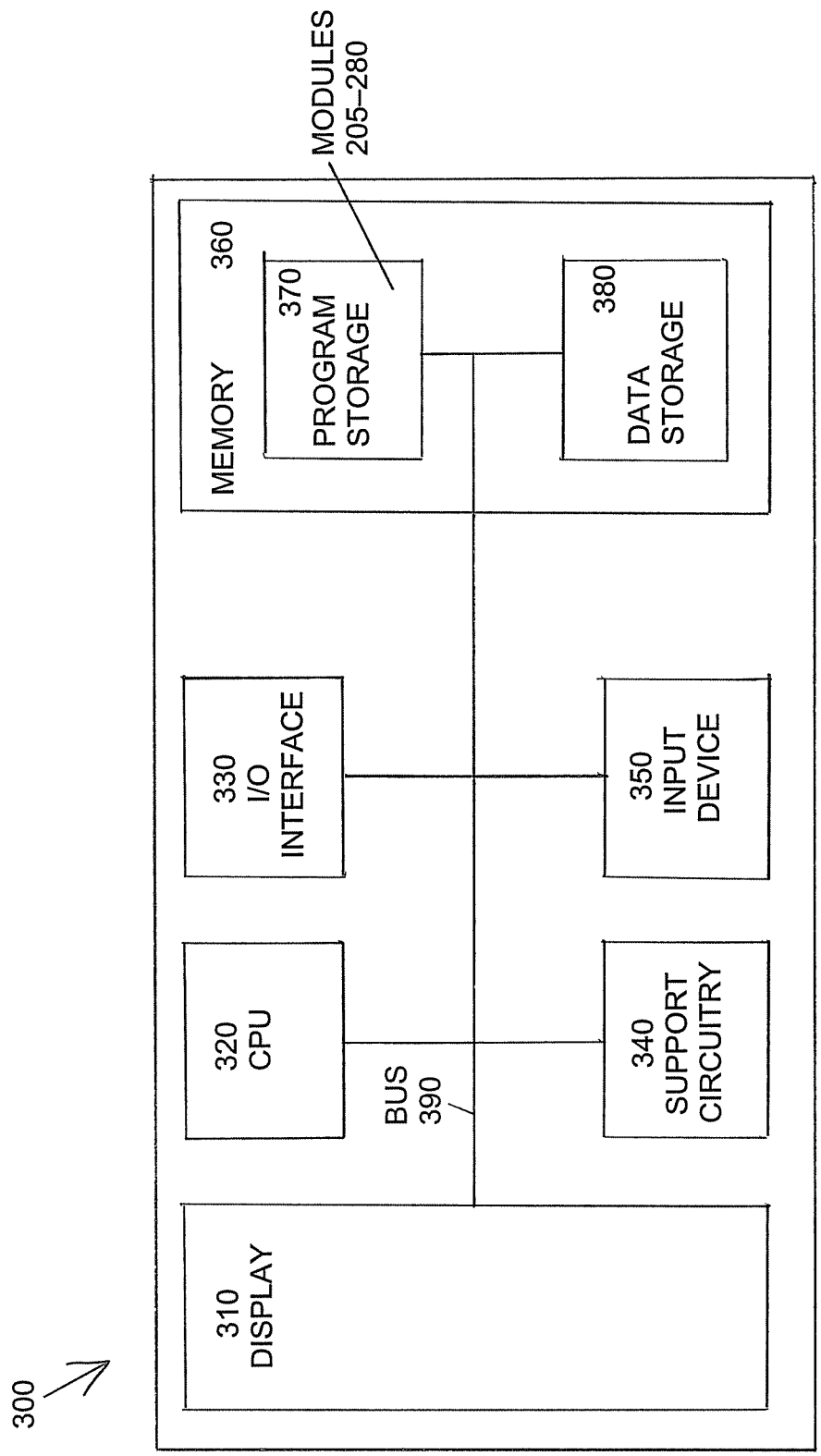
FIG. 4 is a block diagram of a computer device for implementing the automated video editing system of an embodiment of the present invention.

FIG. 4 shows an exemplary block diagram of a computer system 300 in which the automated digital video system of the present invention can be implemented. Computer system 300 includes a processor 320, such as a central processing unit, an input/output interface 330 and support circuitry 340. In certain embodiments, where the computer system 300 requires a direct human interface, a display 310 and an input device 350 such as a keyboard, mouse or pointer are also provided. The display 310, input device 350, processor 320, and support circuitry 340 are shown connected to a bus 390 which also connects to a memory 360. Memory 360 includes program storage memory 370 and data storage memory 380. Note that while computer system 300 is depicted with direct human interface components display 310 and input device 350, programming of modules and exportation of data can alternatively be accomplished over the input/output interface 330, for instance, where the computer system 300 is connected to a network and the programming and display operations occur on another associated computer, or via a detachable input device as is known with respect to interfacing programmable logic controllers.

Program storage memory 370 and data storage memory 380 can each comprise volatile (RAM) and non-volatile (ROM) memory units and can also comprise hard disk and backup storage capacity, and both program storage memory 370 and data storage memory 380 can be embodied in a single memory device or separated in plural memory devices. Program storage memory 370 stores software program modules and associated data, and in particular stores an advertising video receiving module 205, advertising video identification module 210, advertising video broadcast parameter receiving module 220, advertising video queuing module 225, advertising video decompilation and normalization module 230, advertising video editing module 235, action button creation module 240, content video receiving, decompilation and normalization module 250, advertising video selection module 255, video splicing module 260, action video integration module 265, joined video conversion module 270, converted joined video transmission module 275, user reply receiving module 280, or a combination including at least one of the foregoing modules. Data storage memory 380 stores advertising video, content video, edited video, advertising instructions, and other data generated by the one or more modules of the present invention.

It is to be appreciated that the computer system 300 can be any computer such as a personal computer, minicomputer, workstation, mainframe, a dedicated controller such as a programmable logic controller, or a combination thereof. While the computer system 300 is shown, for illustration purposes, as a single computer unit, the system can comprise a group of computers which can be scaled depending on the processing load and database size.

Computer system 300 preferably supports an operating system, for example stored in program storage memory 370 and executed by the processor 320 from volatile memory. According to an embodiment of the invention, the operating system contains instructions for interfacing computer system 300 to the Internet and/or to private networks.

The system and method of the present invention have been described above and with reference to the attached drawings; however, modifications will be apparent to those of ordinary skill in the art and the scope of protection for the invention is to be defined by the claims that follow.

We claim:

1. An automated digital video editing system, the system comprising:
 a memory that stores calculation modules and data;
 a processor coupled to the memory; and
 an advertising video receiving module that receives an advertising video and stores it into the memory;
 an advertising video identification module that assigns a unique identifier to the advertising video;
 an advertising video broadcast parameter receiving module that receives parameters for integrating the advertising video with content video into a joined video and transmitting the joined video, and that stores the parameters into the memory;
 an advertising video queuing module that places the advertising video into a queue, based on the stored parameters for integrating the advertising video with content video;
 an advertising video decompilation and normalization module that decompiles and normalizes the advertising video into a universal format;
 an advertising video editing module that edits the video;
 an action button creation module that creates action buttons to associate with the advertising video, based on the stored parameters for broadcasting the advertising video;
 a content video receiving, decompilation and normalization module that receives a content video and an identifier of the type of content and stores both into the memory;
 an advertising video selection module that selects an advertising video for the received content video, selecting the advertising video from the top of queued advertising videos for that type of content video;
 a video splicing module that edits the advertising video together with the content video into a joined video, storing the joined video into the memory;
 an action button integration module that integrates the created action buttons into the joined video;
 a joined video conversion module that converts the joined video into a format based on the stored parameters for integrating the advertising video with content video, storing the converted joined video into the memory;
 a converted joined video transmission module that transmits the converted joined video to recipients, based on the stored parameters for transmitting the joined video; and
 a user reply receiving module that receives responses from recipients who respond via the action buttons, and that stores the received responses into the memory.

2. The automated digital video editing system of claim 1, wherein the video splicing module edits at least one advertising video to the beginning of the content video.

3. The automated digital video editing system of claim 1, wherein the video splicing module edits at least one advertising video to the end of the content video.

4. The automated digital video editing system of claim 1, wherein the video splicing module edits the same advertising video to the beginning and the end of the content video.

5. The automated digital video editing system of claim 1, wherein the video splicing module edits one advertising video to the beginning of the content video and a second advertising video to the end of the content video.

6. The automated digital video editing system of claim 5, wherein the first and second advertising videos are connected with the same advertising campaign.

7. The automated digital video editing system of claim 1, wherein the video splicing module divides the content video into two or more parts and edits one or more advertising videos in between the two or more parts of the content video.

8. The automated digital video editing system of claim 1, wherein the parameters for broadcasting the advertising video are selected from the group consisting of: a number of plays of the advertising video; a content provider for which the advertising video is to be associated; a list of recipients for the converted video; a geographical area in which to distribute the converted video; and a list of types of mobile devices that will receive the converted video.

9. The automated digital video editing system of claim 1, wherein the user reply receiving module stores the received responses into the memory in the form of a database.

10. The automated digital video editing system of claim 1, where the converted joined video transmission module transmits the converted joined video to an aggregator for distribution to mobile users.

11. A method for automatically combining video advertising with content for mobile distribution, the method comprising:
 receiving an advertising video and storing it in a memory;
 assigning a unique identifier to the advertising video;
 receiving parameters for broadcasting the advertising video, and storing the parameters into the memory;
 analyzing the parameters for broadcasting the advertising video and placing it into a queue for integration with content video;
 decompiling and normalizing the advertising video into a universal format;
 editing the advertising video;
 creating action buttons for the advertising video;

receiving a content video from a content provider, together with an identifier of the type of content, and storing the video and identifier into the memory;

for the type of content video received and stored in memory, selecting the next advertising video from the queue for which the received parameters designate that type of content;

splicing the advertising video together with the content video into a joined video;

integrating the created action buttons into the joined video;

converting the joined video into a converted joined video with a format based on the received parameters for broadcasting the advertising video;

transmitting the converted joined video to recipients, based on the stored parameters for broadcasting the advertising video; and receiving responses from recipients via an action button and storing the received responses into the memory.

12. The automated digital video editing method of claim 11, wherein the video splicing module edits at least one advertising video to the beginning of the content video.

13. The automated digital video editing method of claim 11, wherein the video splicing module edits at least one advertising video to the end of the content video.

14. The automated digital video editing method of claim 11, wherein the video splicing module edits the same advertising video to the beginning and the end of the content video.

15. The automated digital video editing method of claim 11, wherein the video splicing module edits one advertising video to the beginning of the content video and a second advertising video to the end of the content video.

16. The automated digital video editing method of claim 15, wherein the first and second advertising videos are connected with the same advertising campaign.

17. The automated digital video editing method of claim 11, wherein the video splicing module divides the content video into two or more parts and edits one or more advertising videos in between the two or more parts of the content video.

18. The automated digital video editing method of claim 11, wherein the parameters for broadcasting the advertising video are selected from the group consisting of: a number of plays of the advertising video; a content provider for which the advertising video is to be associated; a list of recipients for the converted video; a geographical area in which to distribute the converted video; and a list of types of mobile devices that will receive the converted video.

19. The automated digital video editing method of claim 11, wherein the received responses are stored into the memory in the form of a database.

20. The automated digital video editing method of claim 11, where the converted joined video is transmitted to an aggregator for distribution to mobile users.

* * * * *

UNITED STATES PATENT AND TRADEMARK OFFICE
Certificate

Patent No. 8,554,054 B2                                                      Patented: October 8, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Emil George Innocenti, Wayne, NJ (US); Robert John Spangler, Madison, NJ (US); and Cesar Bandera, East Brunswick, NJ (US).

Signed and Sealed this Fifteenth Day of April 2014.

<div style="text-align:right">

THAI TRAN
*Supervisory Patent Examiner*
Art Unit 2484
Technology Center 2400

</div>